United States Patent [19]
Allain et al.

[11] 4,195,071
[45] Mar. 25, 1980

[54] POLYETHERS TO OBTAIN ANHYDROUS MAGNESIUM CHLORIDE

[75] Inventors: Ronald J. Allain, Richmond, Tex.; David G. Braithwaite, Golf, Fla.; Joseph P. Maniscalco, Sugar Land, Tex.

[73] Assignee: Nalco Chemical Company, Oak Brook, Ill.

[21] Appl. No.: 16,710

[22] Filed: Mar. 1, 1979

[51] Int. Cl.$^2$ ............................................. C01F 5/34
[52] U.S. Cl. ..................................... 423/498; 203/12; 203/64
[58] Field of Search ................... 423/498; 203/12, 14, 203/56, 64

[56] References Cited

U.S. PATENT DOCUMENTS

| | | | |
|---|---|---|---|
| 2,271,873 | 2/1942 | Perkins et al. | 568/613 |
| 2,666,774 | 1/1954 | Grenall | 568/680 |
| 3,983,224 | 9/1976 | Allain et al. | 423/498 |

Primary Examiner—Brian E. Hearn
Attorney, Agent, or Firm—John G. Premo; Robert A. Miller

[57] ABSTRACT

In a process of producing anhydrous magnesium chloride of the type comprising:

A. Mixing together a magnesium chloride hydrate, said hydrate containing minor amounts of water-soluble sulfate and boron compounds as impurities with diethyl ether of tetraethylene glycol to prepare 0.1–6.0% by weight slurry of $MgCl_2$ in the diethyl ether of tetraethylene glycol and an azeotropic agent having a boiling point less than the diethyl ether of tetraethylene glycol in a quantity sufficient to remove water from said slurry;

the improvement which comprises substituting dibutyl ether of tetraethylene glycol for the diethyl ether of tetraethylene glycol.

1 Claim, No Drawings

POLYETHERS TO OBTAIN ANHYDROUS MAGNESIUM CHLORIDE

U.S. Pat. No. 3,983,224 discloses a process for producing anhydrous magnesium chloride. This process is described in the abstract as follows:

A. Mixing together a magnesium chloride hydrate, said hydrate containing minor amounts of water-soluble sulfate and boron compounds as impurities with diethyl ether of tetraethylene glycol to prepare 0.1–6.0% by weight slurry of $MgCl_2$ in the diethyl ether of tetraethylene glycol and an azeotropic agent having a boiling point less than the diethyl ether of tetraethylene glycol in a quantity sufficient to remove water from said slurry;

B. Distilling water from said slurry wherein an anhydrous solution of $MgCl_2$ in diethyl ether of tetraethylene glycol containing the water-soluble sulfate and boron compounds as insoluble impurities is formed;

C. Separating said $MgCl_2$ solution from the insoluble impurities;

D. Adding to the $MgCl_2$ solution about 3.0 moles of ethylene glycol per mole of $MgCl_2$ present so as to prepare a $MgCl_2 \cdot 3$ moles ethylene glycol complex precipitate;

E. Separating precipitate from the diethyl ether of tetraethylene glycol and recovering the precipitate;

F. Dissolving said precipitate in ethylene glycol to prepare a solution of the precipitate in ethylene glycol, said ethylene glycol being used in a quantity so as to prepare an ethylene glycol solution containing from 1 to 20% by weight $MgCl_2$;

G. Treating the ethylene glycol magnesium chloride solution with ammonia to form a magnesium chloride-ammonia complex which is insoluble in the ethylene glycol with the temperature of the ethylene glycol-magnesium chloride solution being within the range of between $-15°$ to $50°$ C.;

H. Separating the magnesium chloride-ammonia complex from the ethylene glycol;

I. Washing the magnesium chloride-ammonia complex with a polar solvent having a lower boiling point than ethylene glycol to remove any ethylene glycol entrained in the magnesium chloride-ammonia complex;

J. Heating the magnesium chloride-ammonia complex to a temperature sufficient to drive off the ammonia for a sufficient period of time to remove the ammonia, thereby forming anhydrous magnesium chloride; and then, K. Recovering anhydrous magnesium chloride which has a magnesium oxide content of less than 0.8% by weight and which is substantially free of impurities.

In step A there is utilized the compound, diethyl ether of tetraethylene glycol (hereafter referred to as DETEG). This material is a solvent for magnesium chloride. It is treated to produce an anhydrous magnesium chloride-DETEG solution. In step D of the above described process, ethylene glycol is used to extract the magnesium chloride from the DETEG. This extract is in the form of an ethylene glycol magnesium precipitate.

After the precipitate forms, analysis of DETEG shows that it contains substantial quantities of both ethylene glycol and magnesium chloride. As the DETEG is used, it is then necessary to remove the glycol therefrom which adds to the cost of the overall process.

The present invention, in utilizing dibutyl ether of tetraethylene glycol (hereafter referred to as DBTEG) in place of DETEG, allows a clean separation between DBTEG and the ethylene glycol-magnesium chloride precipitate to form. Analysis shows that virtually no ethylene glycol or magnesium chloride is left as residuum in DBTEG.

To illustrate the invention, the following test work was done:

To 600 grams of DBTEG were added 60 grams of 30% magnesium chloride brine. This was dehydrated under 28.5" of vacuum and was then filtered. After filtration, there was added to the anhydrous DBTEG system 120 grams of ethylene glycol. A clean two-layer system appeared. The DBTEG layer was free of magnesium chloride and contained less than 1% ethylene glycol. The ethylene glycol-magnesium chloride layer contained less than 0.5 DBTEG.

Having thus described our invention, it is claimed as follows:

1. An improved process for producing anhydrous magnesium chloride of the type comprising:

A. Mixing together a magnesium chloride hydrate, said hydrate containing minor amounts of water-soluble sulfate and boron compounds as impurities with diethyl ether of tetraethylene glycol to prepare 0.1–6.0% by weight slurry of $MgCl_2$ in the diethyl ether of tetraethylene glycol and an azeotropic agent having a boiling point less than the diethyl ether of tetraethylene glycol in a quantity sufficient to remove water from said slurry;

B. Distilling water from said slurry wherein an anhydrous solution of $MgCl_2$ in diethyl ether of tetraethylene glycol containing the water-soluble sulfate and boron compounds as insoluble impurities is formed;

C. Separating said $MgCl_2$ solution from the insoluble impurities;

D. Adding to the $MgCl_2$ solution about 3.0 moles of ethylene glycol per mole of $MgCl_2$ present so as to prepare a $MgCl_2 \cdot 3$ moles ethylene glycol complex precipitate;

E. Separating precipitate from the diethyl ether of tetraethylene glycol and recovering the precipitate;

F. Dissolving said precipitate in ethylene glycol to prepare a solution of the precipitate in ethylene glycol, said ethylene glycol being used in a quantity so as to prepare an ethylene glycol solution containing from 1 to 20% by weight $MgCl_2$;

G. Treating the ethylene glycol magnesium chloride solution with ammonia to form a magnesium chloride-ammonia complex which is insoluble in the ethylene glycol with the temperature of the ethylene glycol magnesium chloride solution being within the range of between $-15°$ to $50°$ C.;

H. Separating the magnesium chloride-ammonia complex from the ethylene glycol;

I. Washing the magnesium chloride-ammonia complex with a polar solvent having a lower boiling point than ethylene glycol to remove any ethylene glycol entrained in the magnesium chloride-ammonia complex;

J. Heating the magnesium chloride-ammonia complex to a temperature sufficient to drive off the ammonia for a sufficient period of time to remove the ammonia, thereby forming anhydrous magnesium chloride; and then.

K. Recovering anhydrous magnesium chloride which has a magnesium oxide content of less than 0.8% by weight and which is substantially free of impurities, the improvement which comprises substituting dibutyl ether of tetraethylene glycol for the diethyl ether of tetraethylene glycol.

* * * * *